June 8, 1965 D. L. HINGS 3,188,560

SURVEY APPARATUS HAVING SYNCHRONOUSLY ROTATABLE MEANS FOR DETERMINING AND RECORDING MINUTE DEVIATIONS IN THE EARTH'S TOTAL MAGNETIC FIELD

Filed Dec. 4, 1959 10 Sheets-Sheet 1

INVENTOR.
DONALD L. HINGS
BY
Stoddling and Frost
ATTORNEYS

SURVEY APPARATUS HAVING SYNCHRONOUSLY ROTATABLE MEANS FOR DETERMINING AND RECORDING MINUTE DEVIATIONS IN THE EARTH'S TOTAL MAGNETIC FIELD

Filed Dec. 4, 1959 10 Sheets-Sheet 2

INVENTOR.
DONALD L. HINGS
BY
Stoodling and Krost
ATTORNEYS

INVENTOR.
DONALD L. HINGS
BY
Stoodling and Kroat.
ATTORNEYS

SURVEY APPARATUS HAVING SYNCHRONOUSLY ROTATABLE MEANS FOR DETERMINING AND RECORDING MINUTE DEVIATIONS IN THE EARTH'S TOTAL MAGNETIC FIELD

Filed Dec. 4, 1959

INVENTOR.
DONALD L. HINGS
BY
Woodling and Krost.
ATTORNEYS

June 8, 1965 D. L. HINGS 3,188,560

SURVEY APPARATUS HAVING SYNCHRONOUSLY ROTATABLE MEANS
FOR DETERMINING AND RECORDING MINUTE DEVIATIONS
IN THE EARTH'S TOTAL MAGNETIC FIELD

Filed Dec. 4, 1959 10 Sheets-Sheet 5

INVENTOR.
DONALD L. HINGS
BY Shoodling and Kroot.
ATTORNEYS

INVENTOR.
DONALD L. HINGS
BY
Strodling and Krost
ATTORNEYS

SURVEY APPARATUS HAVING SYNCHRONOUSLY ROTATABLE MEANS FOR DETERMINING AND RECORDING MINUTE DEVIATIONS IN THE EARTH'S TOTAL MAGNETIC FIELD

Filed Dec. 4, 1959

10 Sheets-Sheet 7

INVENTOR.
DONALD L. HINGS

BY
Stoodling and Krost.
ATTORNEYS

INVENTOR.
DONALD L. HINGS
BY
Stoodling and Krost.
ATTORNEYS

June 8, 1965 D. L. HINGS 3,188,560

SURVEY APPARATUS HAVING SYNCHRONOUSLY ROTATABLE MEANS FOR DETERMINING AND RECORDING MINUTE DEVIATIONS IN THE EARTH'S TOTAL MAGNETIC FIELD

Filed Dec. 4, 1959 10 Sheets-Sheet 9

INVENTOR.
DONALD L. HINGS
BY
Stoodling and Kroot
ATTORNEYS

INVENTOR.
DONALD L. HINGS
BY Shoodling and Krost.
ATTORNEYS

United States Patent Office 3,188,560
Patented June 8, 1965

3,188,560

SURVEY APPARATUS HAVING SYNCHRONOUSLY ROTATABLE MEANS FOR DETERMINING AND RECORDING MINUTE DEVIATIONS IN THE EARTH'S TOTAL MAGNETIC FIELD

Donald L. Hings, Vancouver, British Columbia, Canada, assignor to Electronic Geophysical Surveys Ltd., Vancouver, British Columbia Filed Dec. 4, 1959, Ser. No. 857,336
16 Claims. (Cl. 324—8)

The invention relates to apparatus and method for detecting the direction of the earth's total magnetic field and converting the information to recording tapes, visual indicators, or computing machines. The invention is generally applicable to scanning and determining the location of objects relative to the apparatus with respect to time and movement, and is specifically applicable to geophysical survey work including the detection of objects and variable field influences above and below the earth's surface and above and below the water's surface. For example, while not limited thereto, the invention finds great utility in the location of oil deposits below the earth's surface and of submarines below the water's surface.

This application is a continuation-in-part of my application Serial No. 731,358 filed April 28, 1958, now U.S. Patent No. 3,085,197, entitled "Inductor Survey Apparatus and Method for Determining the Presence of Oil-Bearing Substrata," and the subject matter of said application is fully incorporated in this application the same as though it were included herein.

The present invention functions to scan or search objects or variable field influences essentially wherever magnetic lines exist and is not limited to areas where electromagnetic waves may be propagated as required by conventional scanning equipment as we know it.

An object of the invention is to provide apparatus and method which uses the earth's total magnetic field as the base reference and deviations therefrom as the source of scanning and detection.

Another object of the invention is to provide apparatus and method which divorces all common variables from the final measurement and renders the apparatus and method solely responsive to the deviations in the earth's total magnetic field, except those disturbances arising from severe magnetic storms.

Another object of the invention is to provide apparatus and method which measures the azimuth of the earth's total magnetic field by a scanning operation and which measures the deviation angle of the total magnetic field from the normal by measuring the potentials induced in a coil by the deviation change in the magnetic field with respect to the scanning operation.

Another object of the invention is to provide for generating a sine wave in a coil when the axis of the coil is in alignment with the earth's total magnetic field and for neutralizing the sine wave by apparatus and method to produce a relatively zero voltage output from the coil.

Another object of the invention is to provide for generating a voltage in the coil whereby the amplitude of the voltage is a measurement of the amount that the changed magnetic field deviated from the normal position.

Another object of the invention is to provide a scanning device and a non-scanning device wherein the output of each is delivered to a mixer so that the resultant voltage delivered by the mixer is a measure of the scanning output only.

Another object of the invention is to provide apparatus and method for locating submarines below the surface of the water.

Another object of the invention is to provide apparatus for geophysical surveys involving determination of oil-bearing substrata.

Another object of the invention is the provision of an instrument highly sensitive to the direction of the earth's magnetic field that records variation in this field in quadrature on recording tapes.

Another object of this invention is the provision of apparatus that responds faster than the earth's modulating or minutial diurnal waves but slower than vibration from mobile carriers such as vehicles, boats and aircraft.

Another object of the invention is to automatically and continuously record angular distortion of the earth's field to thereby eliminate delays required when periodic readings are taken by an operator.

Another object of the invention is to produce a recording tape for programming to computer apparatus to obtain coordinates.

Another object of the invention is to provide an instrument that is self-leveling at a faster rate than the influencing modulating or minutial diurnal frequency being detected.

Another object of the invention is to utilize two detection coils equally and oppositely opposed to cancel local and modulating or minutial diurnal influences of intensity changes without detracting from the quadrature measurements being recorded from the direction of the earth's field.

Another object of the invention is to displace the two coils in a linear direction to that of the vehicle travel to thereby indicate a magnetic intensity gradient.

Another object of the invention is to control two displaced coils alternately, to create a sweep pattern or effectively scan for and/or from moving vehicles.

Another object of the invention is for the response of the two coils to be slow enough to indicate gradient changes for vehicle speeds with negligible response to vibration and bumping frequencies, such as those experienced in helicopter and road vehicles.

The invention specifically relates to a means of magnetic measurements for geophysical purposes suited for deployment in vehicles. The magnetic measurements include continuous recording of deviations of the earth's magnetic field angle with respect to time and predetermined base lines. This angular measurement is preferably made when the vehicle is not in travel for accurate results.

Another object is the recording of the intensity of the earth's magnetic field based on time and distance traveled between instrument and anomaly source.

It is the purpose of this instrument to fulfill the need for precise directive measurements under severe operating conditions including weather and terrain and still compensate for severe diurnal influences, and in general, replace the ground operator.

The tolerance of angular measurement is within a few seconds of a degree and equivalent sensitivities of .01 gamma.

At these sensitivites it has been found the earth's diurnal variations are modulated with many higher frequencies which are characterized as minutial diurnal waves. The stronger of these waves are in the order of 1 to 5 cycles per minute with amplitudes averaging .01 to .5 gamma and usually have the greatest amplitude during the noonday period. It is found that these minutial waves create the greatest limitations to precise ground measurement for periodic readings and it is the purpose of this continuous recording system to measure the variables created by these magnetic minutial waves to thereby give a regional mean that would not be obtainable under such conditions by periodic readings.

Other objects and a fuller understanding of the invention may be had by referring to the following description and claims, taken in conjunction with the accompanying drawings, in which:

The invention utilizes a first detection coil having an extremely high inductance (2,000 henries) and a capacity to form a resonant period of several seconds per cycle and has relatively high sensitivity up to one cycle per minute. The coil is oriented for operation so that the core is on a plane with the maximum lines of the earth's magnetic fields. The coil utilizes a high permeability core having rotatable ends to produce a sweep action. These ends are mounted on bearings having an axis parallel to the core and consist of the same permeable material as the main core. These ends are mounted to rotate relative to the center axis of the core, and are oppositely positioned on each end of the core. The rotation of the core ends change the mean angle of maximum inductance continuously, in a pattern conical from the center of the core each way. This conical rotating pattern produces a wave-form by induction from the earth's magnetic lines whenever not in alignment through the main core to produce a voltage in the coil, equal to the angle of the core off the magnetic line maximum. When the conical pattern mean center is oriented along the earth's magnetic lines, there is no induction variation due to rotation, and no voltage is produced from the coil, thus indicating the orientation is centered on the earth's magnetic lines. When the core and coil assembly are misaligned with the earth's magnetic lines, the wave shape produced by the rotation and resulting increase and decrease of coupling to the earth's magnetic field appears in relative phase relation on the recorder to thereby indicate the azimuth angle and degree of distortion from the misalignment of the magnetic detecting unit.

The recorder produces an indicating marker or blip on the tape for the commencement of each 360° of rotation of the core ends, to thereby indicate the relative position for measurement of a misalignment in respect to the degrees of rotation. This provides the direction of the earth's deviation from normal for each location during one revolution of the core ends, or approvimately every four seconds.

This fast recording also permits continuous readings at one location so that if the minutial diurnal influence is excessive from cycling of intensity occurring several times per minute, then the limits of these effects are observed and recorded as they occur.

Figure 1:
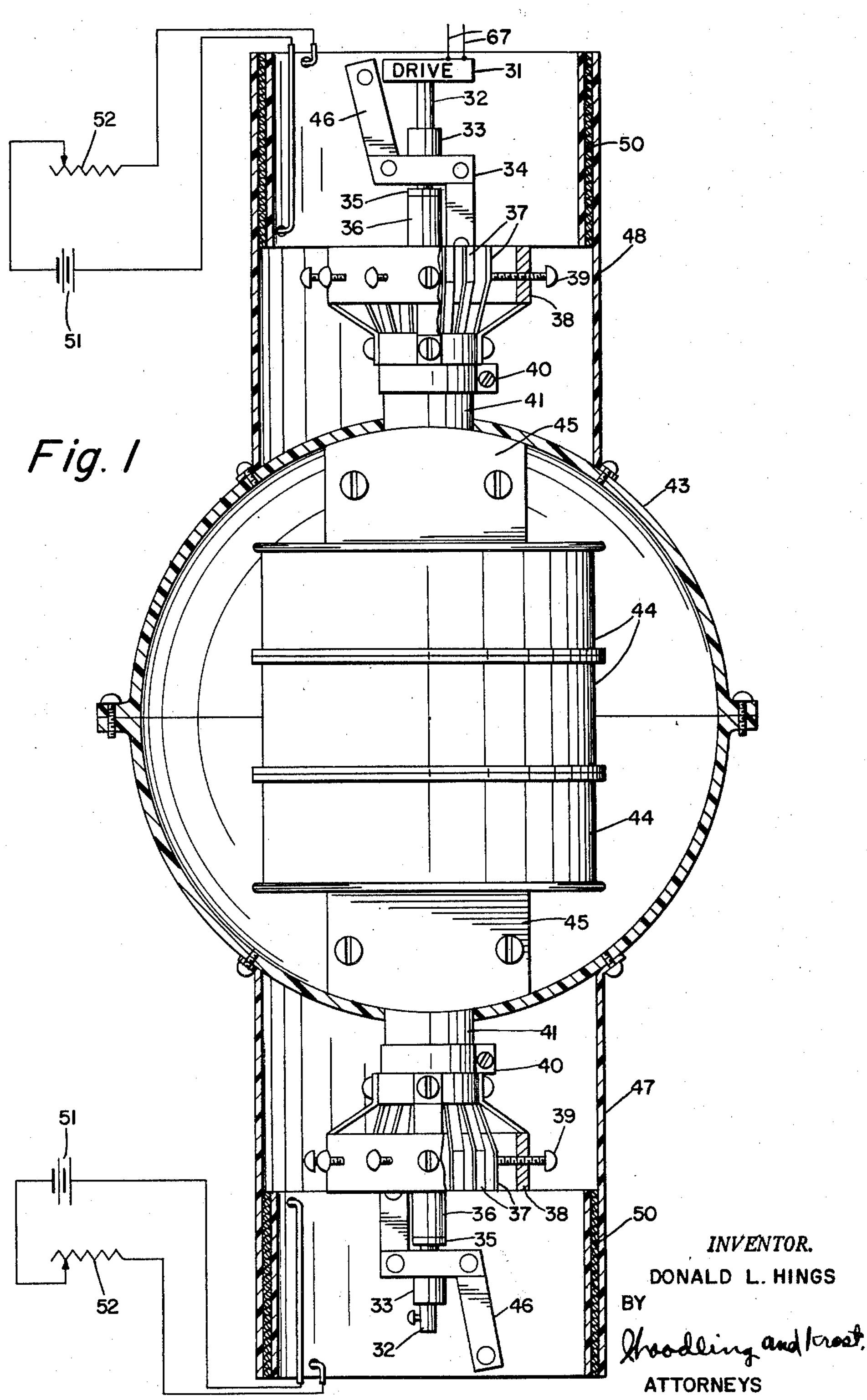
FIGURE 1 is a side elevational view, with the housing shown in section, of a searching or scanning compass embodying the features of the invention.

The FIGURE 1 shows the construction of the magnetic field directional search or sweep compass. The parts are all non-magnetically ploarizable. The central rotating shaft 32 is driven by a drive unit 31 which drives the shaft 32 at a synchronous speed. The drive unit 31 may be of any suitable construction and rotates two swinging armatures 34 which are held to the rotating shaft 32 by collars 33. The swinging armatures 34 are each provided with a vane 46 which revolves as the shaft 32 is rotated. The shaft is rotated in bearings 35 at both ends of the core bushing 36.

Figure 2:
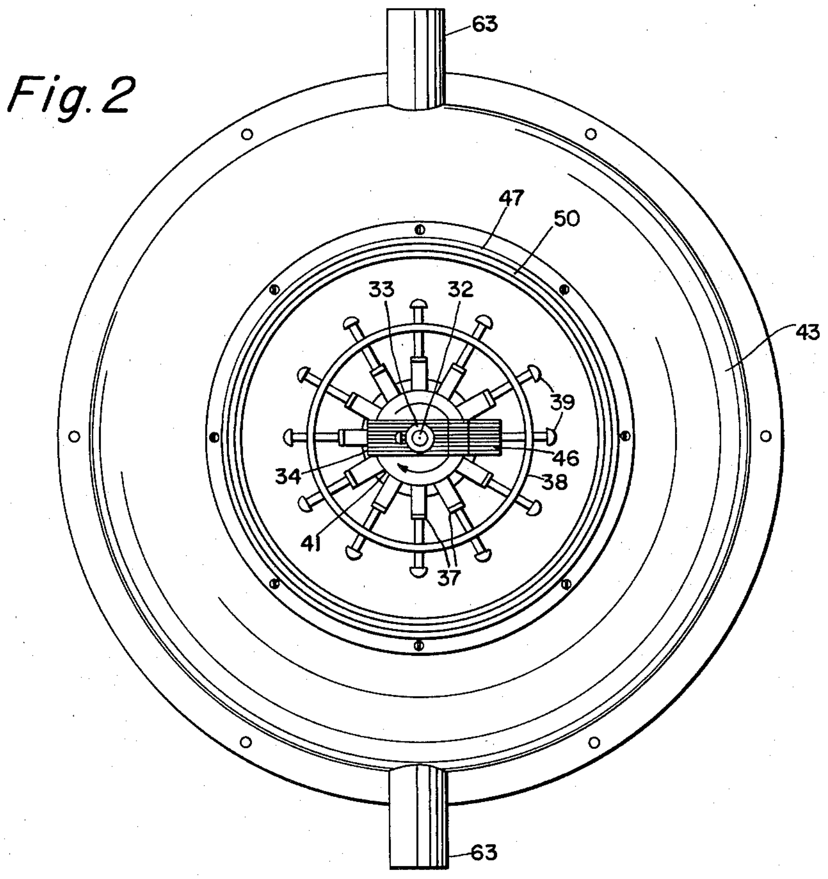
FIGURE 2 is a bottom view of the device shown in FIGURE 1.
Figure 3:
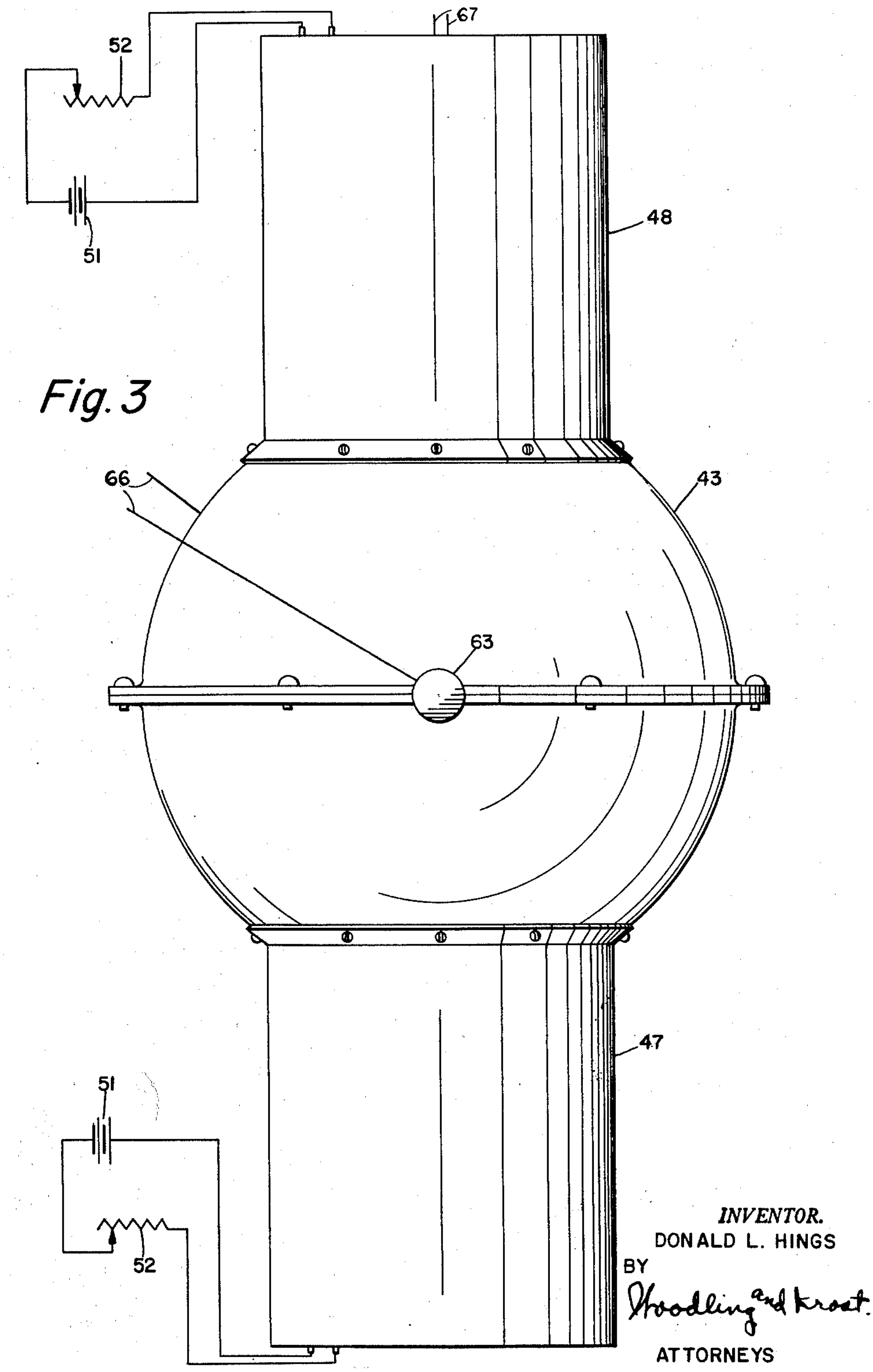
FIGURE 3 is a side elevational view of the device shown in FIGURE 1.

A collar 40 clamps annularly spaced coupling fingers 37 to sides near the ends of the core. A supporting outer ring 38 forms a yoke for holding compensating adjustment screws 39 to vary the proximity of the coupling fingers 37 with respect to the swinging armatures 34. A core 41 forms a circular magnetic core of multiple strands of permeable iron 42 for the coils 44, which are held at the center position of the core by clamps 45. These clamps also support the outer housing 43. The swinging armatures 34 are shown to rotate in a clockwise direction in FIGURE 2, and preferably at the rate of one revolution in four seconds, or fifteen revolutions per minute. The coils 44 are preferably made in three sections which are connected in series. Each of the sections comprises substantially 50 miles of wire of size 42. The inductance of the three sections connected in series and mounted on the core is approximately 2,000 henries and substantially one microfarad terminating capacity, and forms a resonant period of several seconds per cycle and has relatively high sensitivity up to one cycle per minute. More specifically, the arrangement has a resonant period of substantially four seconds per cycle or 15 cycles per minute. The core and coil assembly is enclosed within suitable housings 47 and 48 as shown in FIGURE 3. The housing is preferably heated and thermostatically controlled to maintain the temperature therein at a substantially constant value.

Figure 4:
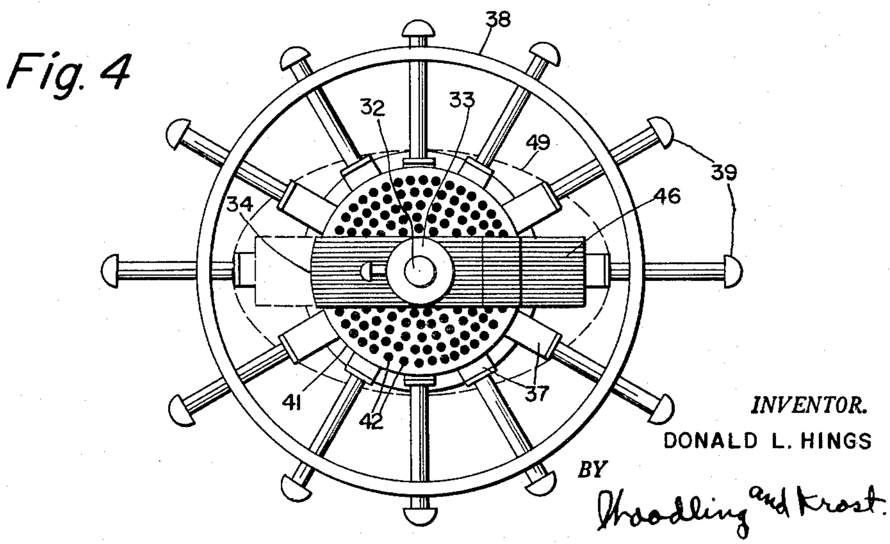
FIGURE 4 is an enlarged view of the central portion of FIGURE 2, showing principally the core compensating arrangement.
Figure 9:
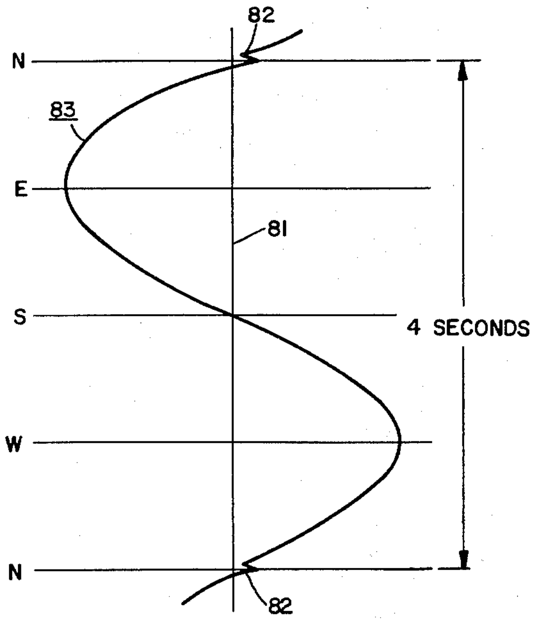
FIGURE 9 is a representation of a sine wave as plotted on the recorder.

The FIGURE 4 shows the basis of neutralizing the voltage generated by the revolving vanes 46. When the armatures 34 are rotated, a sine wave is generated in the coils 44 as shown in FIGURE 9. In this invention, the sine wave is neutralized. The FIGURE 4 shows the basis of neutralizing the sine wave which is produced by the revolving vanes 46 in the earth's field. The armatures 34 are made of permeable iron laminations. The horizontal portion of the armatures 34 couple the vanes 46 to the ends of the core. The revolving vanes 46 represent the angle of sweep or search in a plane diverging away from the axis of the core. The mass of the vane 46 is unsymmetrically unbalanced with respect to shaft 32. The rotation of the vanes 46, if not compensated for, will produce a sine wave. The sine wave is created by the constant speed of the vanes 46 generating more energy during the periods of reversing polarity or when traveling through the center portion of the cycle of the North-South or South-North quadrants. The FIGURE 4 shows the approximate correct neutralizing settings of the screws 39 in the ring 38 for holding the coupling finger laminations 37 in their proximity to an elliptical arrangement indicated by the reference character 49. This ellipsoidal shape of the position of the ends of the coupling finger laminations 37 neutralizes or cancels out the sine wave and permits a high degree of sensitivity to be amplified from the coils 44. The coupling between the armature and the ends of the core is unsymmetrical, or non-uniform.

With the arrangement of the adjustable coupling laminations 37, the voltage of the sine wave may be neutralized to the extent of substantially $1/1000$ of the value of the original sine wave. The original voltage may be further reduced by means of compensating electrical coils 50, which may be mounted inside of the housing 47 and surrounding the rotating vanes 46. The compensating coils 50 may be energized respectively by a battery 51 and an adjustable rheostat 52, which are connected to the end terminals of the coils. The amount that the coils are energized may be adjusted by the rheostats 52. The neutralizing effect produced by the coils is to neutralize the total earth's magnetic field in the proximity of the rotating vanes to thereby reduce the polarity field within the vanes.

Figures 5, 6:
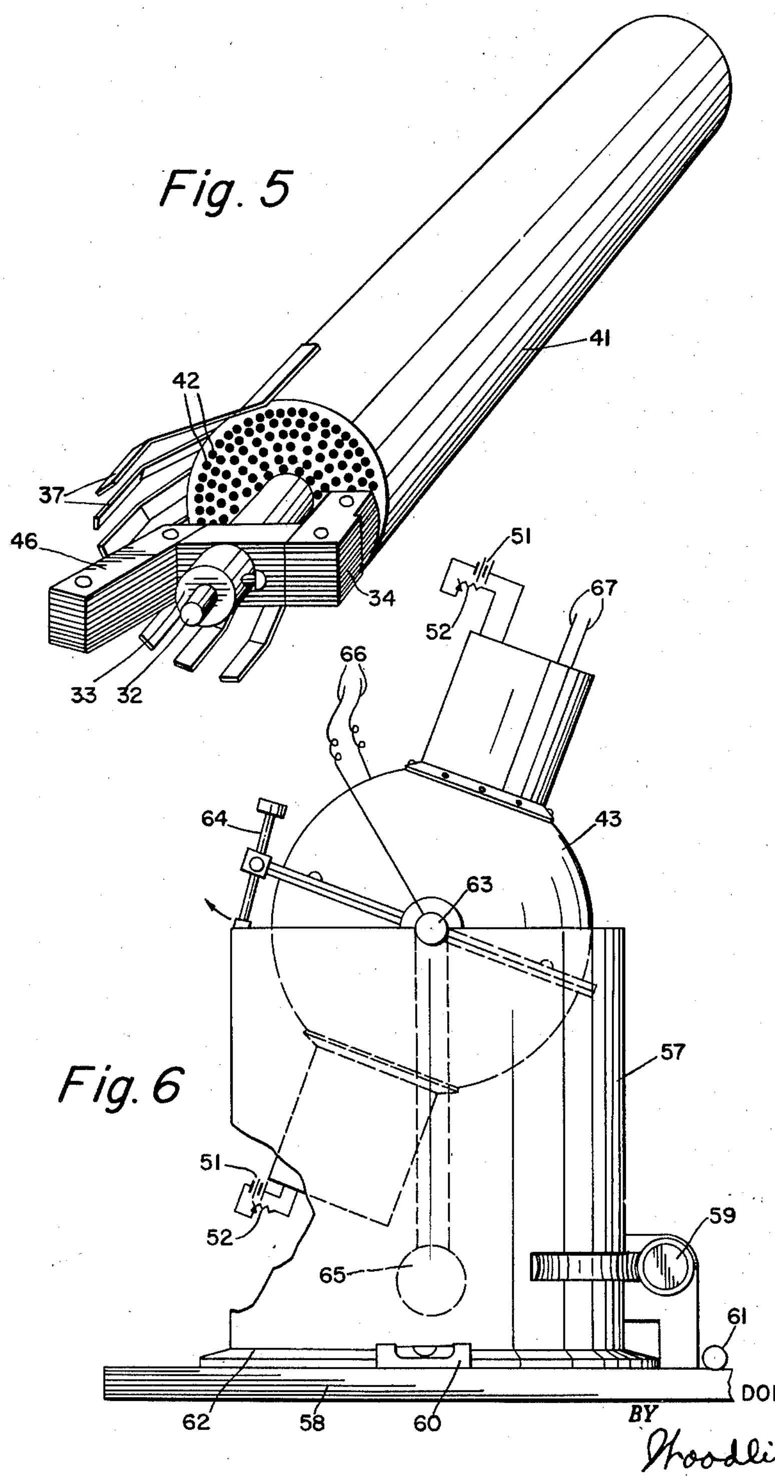
FIGURE 5 is an isometric view of the construction of one end of the core.
FIGURE 6 shows the scanning or searching compass mounted for operation.

The FIGURE 6 shows the search compass of FIGURE 1 mounted for use in a vernier arrangement. The vernier arrangement in FIGURE 6 comprises a cylindrical housing 57 mounted on a base 58. The housing 57 may be turned with respect to the base 58 by means of a vernier 59. The base 58 may be leveled in a horizontal plane by two bubble levels 60 and 61. The bottom of the cylindrical housing 57 may be provided with a cursor for the scale 62. The housing 43 of the search compass may be provided with two bearing shafts 63 which are arranged to rotate in suitable bearing sockets at the top of the cylindrical housing 57. The search compass may be adjusted by means of a vernier screw 64 to produce an inclination angle. After the inclination angle is once established by means of the vernier screw 64, the counterbalance 65 may be anchored or clamped to the bearing shaft 63, after which the vernier screw 64 may be swung out of clearance away from the upper part of the cylindrical housing 57, whereby the position of the search compass is held in the inclined position by means of the counterbalance 65. The terminals for the coil sections 44 are indicated by the wires 66. The lead wires which drive the drive unit 31 are indicated by the reference character 67. The vernier 59 and the vernier screw 64 are operated to produce a zero voltage output and then the counterbalance is clamped, which permits the search compass to remain self-leveling in the North-South plane.

Figure 7:
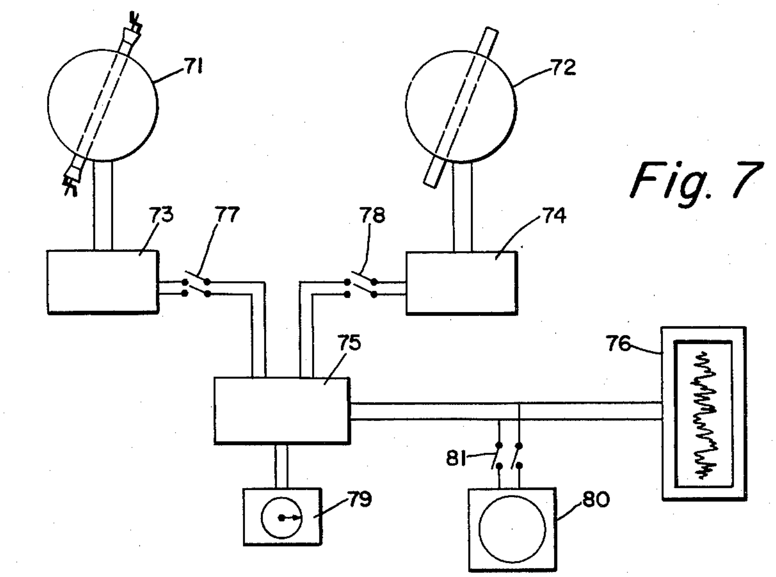
FIGURE 7 is a schematic diagram showing the electrical circuit and a recorder which are operated by a scanning compass and a non-scanning unit.

FIGURE 7 is a diagrammatic circuit in which my search compass may be employed for useful purposes, and may be mounted in a moving vehicle, airplane, helicopter, boat or other suitable carrier, or at a stationary location. In FIGURE 7, the reference character 71 indicates a search or sweep compass, such as shown in FIGURE 1 of the drawing. The potentials induced in the search or scanning compass 71 are responsive to both the earth's minutial diurnal fields and to the deviations of the earth's total magnetic field, and these potentials may be called respectively scanning potentials and non-scanning potentials. The reference character 72 represents a unit without the revolving vanes 46 and associated parts. The unit 72 may be characterized as a non-search or non-sweep unit. The potentials induced in the non-scanning unit 72 are responsive to the earth's minutial diurnal fields and may be called non-scanning potentials.

The output of the coil from the search or sweep compass 71 is electrically connected to an amplifier 73 and the output of the coil of the non-search or non-sweep unit is connected to an amplifier 74. The potentials or voltages induced in the units 71 and 72 are opposite and out-of-phase with respect to each other and the outputs of the two amplifiers 73 and 74 are connected to a mixer 75 for equalizing and canceling the opposite voltages. The output of the mixer 75 is connected to a recorder 76. Also the output of the mixer 75 may be connected to a point position indicator 80 through a switch 81. The point position indicator 80 has a face dial and gives a presentation similar to a radar display unit. The reference character 79 indicates a synchronous timer which is adapted to prodce blip voltage in the wave being recorded by the recorder 76. The blips are synchronously disposed to harmonize with the speed of the scanning operation. The amplifier 73 may be disconnected from the mixer by means of a switch 77 and the amplifier 74 may be disconnected from the mixer 75 by means of a switch 78.

Figure 26:
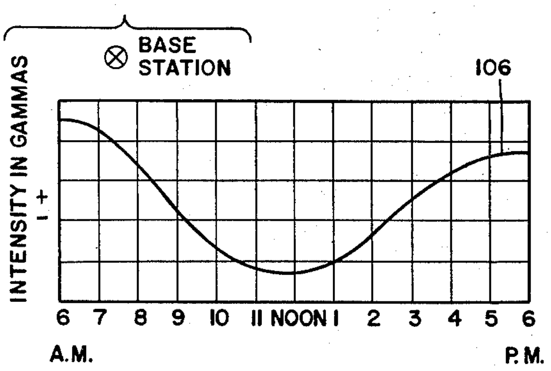
FIGURE 26 shows a diurnal wave from 6 a.m. to 6 p.m., the intensities being shown in gammas.
Figure 27:
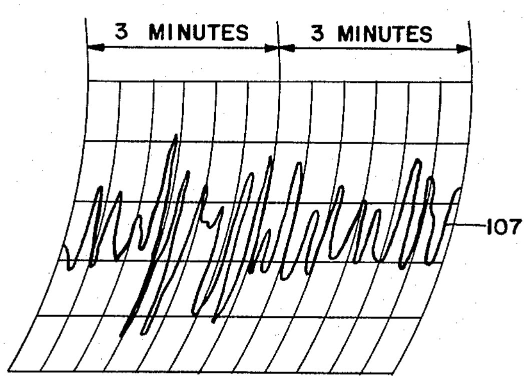
FIGURE 27 is a section of a graph produced by a recorder showing the minutial diurnal waves, the distance between arcuate major dividing lines being three minutes of time, and the graph in this FIGURE 27 being a minutial portion of the graph in FIGURE 26.

If the switch 77 were open and the switch 78 were closed, then the non-search unit 72 would produce a voltage for recording upon the recorder 76. The wave 107, as indicated in FIGURE 27, is typical of such a wave. The wave 107 of FIGURE 27 is a minutial representation of the wave 106 of FIGURE 26, which is a curve showing the diurnal changes from 6 a.m. to 6 p.m. The distance between the major marker lines in FIGURE 27 represents three minutes. Thus the curve 107 is a minutial representation of the curve 106 in FIGURE 26, and the fluctuations in curve 107 of FIGURE 27 occur at the rate of approximately three cycles per minute. Experience shows that the fluctuations may vary in the order of one cycle per minute up to five cycles per minute. The wave 107 is an actual reproduction of a graph taken by a recorder connected to a non-sweep or non-search unit, such as shown in FIGURE 7.

Figure 24:
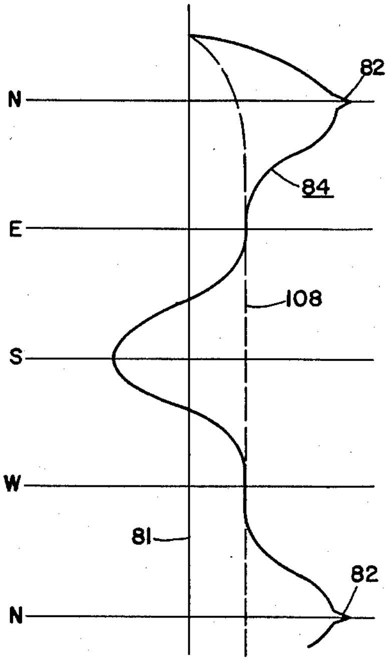
FIGURE 24 is a view similar to that of FIGURE 13 but showing the shape of the resultant generated voltage wave shifted under the influence of the variable intensities of the earth's magnetic field, such as, for example, the minutial diurnal waves.

By connecting the sweep or search unit 71 in opposition to the non-sweep or non-search unit 72, such as shown in FIGURE 7, and with the switches 77 and 78 both closed, the voltage impressed upon the mixer 75 would be canceled, which would leave a wave responsive to the revolving vanes 46. The FIGURE 24 shows a curve 108 by a dash line and this curve represents the voltage which would be generated by a small portion of the minutial wave of FIGURE 27. The FIGURE 24 has a period four seconds long and thus the curve 108 represents a small portion of the curve 107, which is four seconds long. The curve 84 in FIGURE 24 represents the wave produced by the revolving vanes 46. The reference character 81 represents the reference axis for the graph and the blips 82 are produced by the synchronous timer 79 which occur four seconds apart, being the equivalent of one complete revolution of the revolving vanes 46. An object of the circuit in FIGURE 7 is to eliminate or cancel out the voltages generated by intensity changes in the magnetic field, such as by the intensity changes represented by the minutial wave 107 in FIGURE 27.

Figure 8:
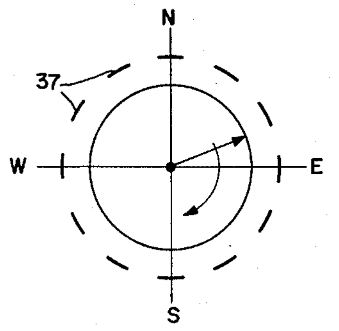
FIGURE 8 is a diagrammatic illustration of the scanning vane with the adjustable compensating magnetic coupling fingers shown in a circle whereby the voltage generated in the coil produces a sine wave.
Figures 10, 11, 12, 13, 14, 15:
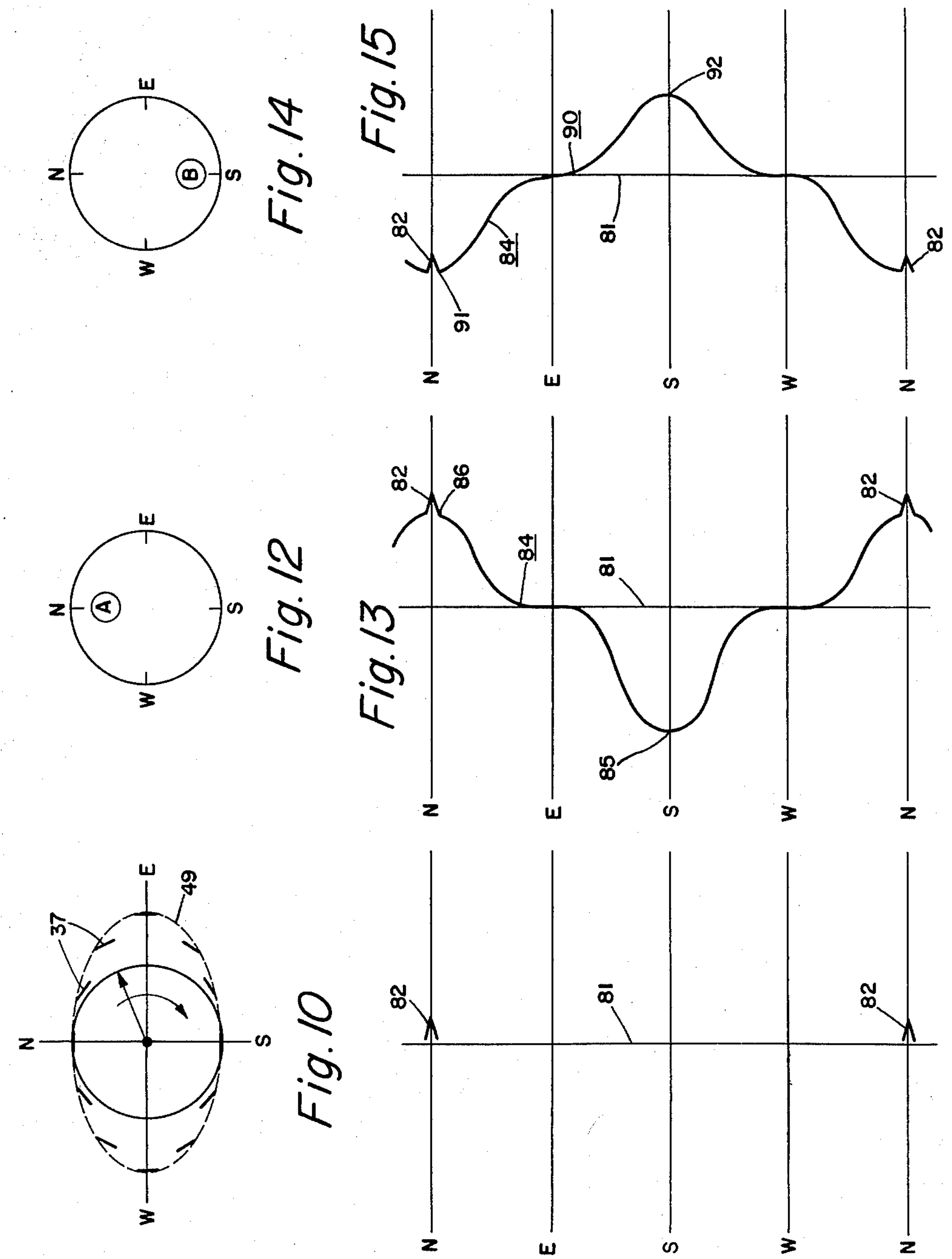
FIGURE 10 is a view similar to FIGURE 8 but showing the adjustable compensating magnetic coupling fingers arranged in elliptical form to neutralize the sine wave to substantially zero.
FIGURE 11 is a view similar to FIGURE 9 but showing the sine wave neutralized to substantially zero.
FIGURE 12 is a diagrammatic illustration of the end of the core with the center of the field being located at position A near the designation "N," indicating north.
FIGURE 13 is a portion of a generated voltage wave as recorded on the recording device which is produced under the situation of FIGURE 12.
FIGURE 14 is a view similar to FIGURE 12 but showing the center of the field being located at position B near the designation "S," indicating south.
FIGURE 15 is a portion of a generated voltage wave as recorded on the recording device which is produced under the situation of FIGURE 14.

If the switch 78 were open in FIGURE 7 and the switch 77 were closed, and the compensating fingers 37 were arranged in a perfect circle as shown in FIGURE 8, then the voltage induced in the coil of the sweep unit 71 would produce a sine wave 83 as shown in FIGURE 9 where the line 81 represents the reference line of the graph and the blips 82 represent the voltage induced therein by the synchronous timer 79. In the present invention, the vane 46 is arranged to rotate one complete revoltuion in four seconds, thereby producing in FIGURE 9 a sine wave having a cycle four seconds long. The sine wave in FIGURE 9 may be canceled to substantially zero by arranging the position of the compensating coupling fingers 37 in elliptical form, as shown in FIGURE 10. Since the sine wave is canceled out in FIGURE 11, the marker blips 82 are the only waves which are produced.

The natural period of the coil 44 and the core of the sweep unit is such as to produce a resonant period which is substantially four seconds long. Thus, the resonant period of the coil and core and the frequency of the voltage produced by the revolving vane 46 are substantially the same.

Figure 25:
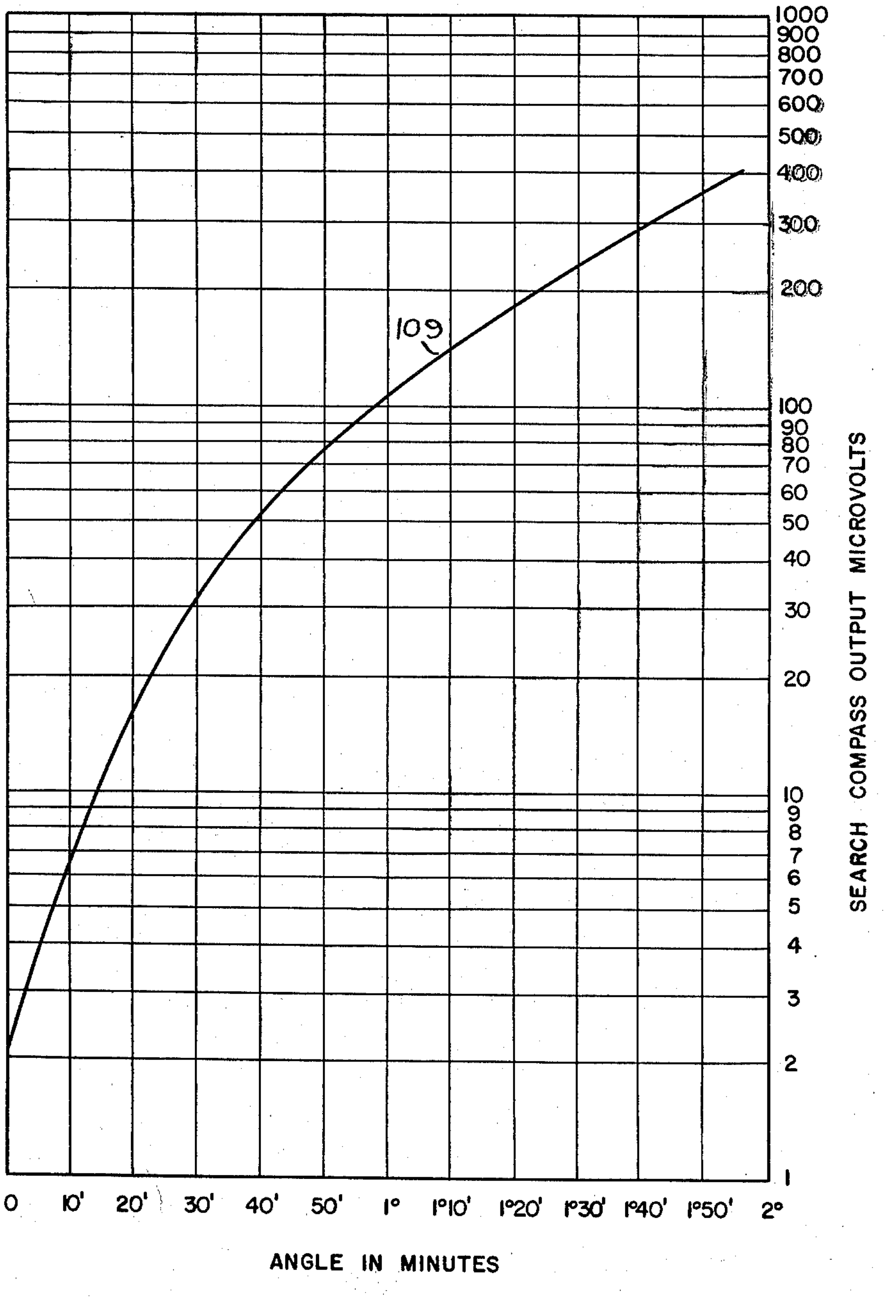
FIGURE 25 is a graph calibrating the mcirovolts in terms of angles in minutes.

The arrangement in FIGURE 7 has particular utility in many applications and may be characterized as a scanning or searching compass which will give the amount that the magnetic flux field has deviated from normal in both the vertical and horizontal components, the horizontal component being measured by the azimuth time of the rotating vanes and the vertical component being measured by the amplitude of the wave produced. The voltage, in turn, may be calibrated on a chart in FIGURE 25 in terms of angles in minutes, indicating the deviation of the magnetic lines from the normal. The voltage is preferably produced by a change in the magnetic lines of force represented in terms of microvolts. The calibration by means of a chart shown in FIGURE 25 may be eliminated by calibrating the recording tape or paper directly in angles in minutes. With respect to the chart in FIGURE 25, if the amplitude of the wave were 100 microvolts under the conditions as shown by a curve 109, then the deviation angle in minutes would be substantially 57 minutes. The curve 109 is primarily based upon the amount of the air gap between the armatures 34 and the ends of the core 41. If this air gap were reduced or changed, then a new calibration curve would be required. The curve 109 of FIGURE 25 must match the unit.

With respect to FIGURES 12 and 13, it is assumed that the total field of the magnetic lines is positioned at A. The positioning of the lines at A may be caused by many external factors, such as the presence of non-uniformities of substrata with respect to the sweeping compass or by the presence of a submarine below the water's surface or of automobiles or other magnetic susceptible objects. The wave produced by the revolving vanes 46 is indicated by the reference character 84, being the same wave as produced in FIGURE 24. The blip markers are indicated by the reference character 82 and the reference line for the recorder is indicated by the reference character 81. The curve 84 has a maximum peak at 85 at the notation "S" (meaning South) with an inverse smaller peak at 86 at the notation "N" (meaning North). This is created by the vanes 46 cutting across more lines of the total field in the South direction than in the North direction when the field is moved to the North, such as indicated by position A. The curve in FIGURE 13 indicated that the object or variable field influence which caused the field to shift to position A is directly North of the zero reading of the search compass. To obtain the angle of the deviation of the magnetic lines as they shift to position A in FIGURE 13, the wave on the recorder is analyzed. FIGURE 13 shows but one four-second period of the wave, but the recorder would be operated continuously for a period of time which may embrace as many as 100 four-second readings. The peaks 85 which appear at the South on all of these 100 four-second periods, and the mean of all these peaks would be the resultant reading in microvolts. The resultant microvolt reading would be translated into angles in minutes by making reference to FIGURE 25. Therefore, the location of the object or variable field influence causing the change or shift in the magnetic lines of force to position A would be accurately determined with respect to the location of the sweep or search compass.

The FIGURES 14 and 15 show the condition when the total field has been shifted to the position B in FIGURE 14. The curve 90 in FIGURE 15 shows the wave produced by the rotation of the vanes 46 with the total field located at B in FIGURE 14. The value of the voltage generated at the peak 91 is greater than the value of the voltage at peak 92, indicating that the object or variable field influence is located South of the zero point of the azimuth reading on the sweep unit. The references with respect to direction are with respect to magnetic North and South and not to true North and South.

In this invention the change in the angle in minutes caused by the deviation in the magnetic field is measured with respect to the maximum voltage of the wave rather than the minimum voltage. Thus, in FIGURE 15 the maximum voltage is at 91 and the minimum is at 92. The reason for using the maximum voltage instead of the minimum is that the minimum may get less and less until it becomes inverted. The maximum keeps increasing and can always be measured.

Figures 16, 17:
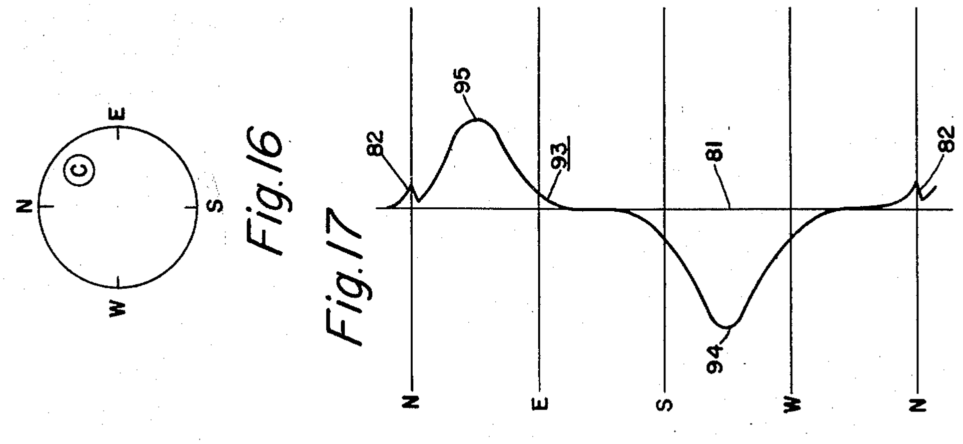
FIGURE 16 is a diagrammatic illustration of the end of the core with the center of the field being located at position C at substantially halfway between the designations "N" and "E," the "E" indicating east.
FIGURE 17 is a portion of a generated voltage wave as recorded on the recording device which is produced under the situation of FIGURE 16.

FIGURES 16 and 17 show the magnetic field shifted to the position C and it is noted that the curve 93 has a maximum peak at 94 and a minimum peak at 95. The direction of the object or variable field influence of FIGURE 16 is substantially midway between North and East, and that is indicated on the curve 93 of FIGURE 17.

Figures 18, 19:
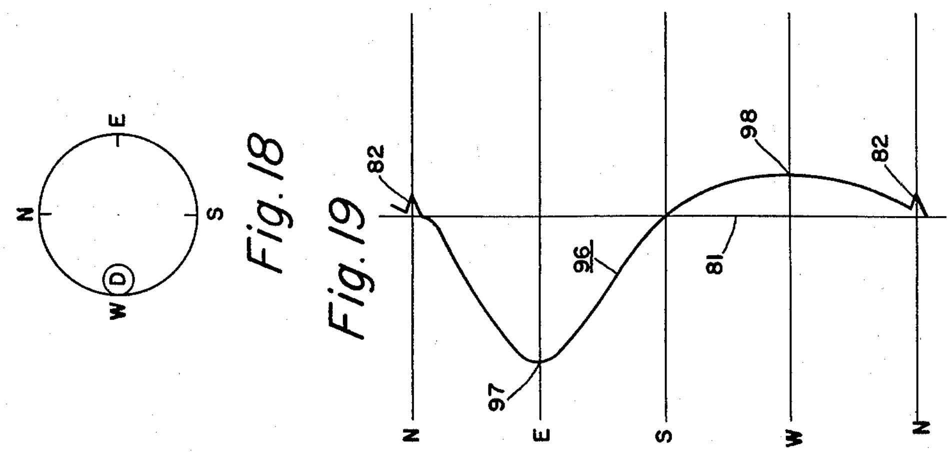
FIGURE 18 is a diagrammatic illustration of the end of of the core with the center of the field further removed, being located at position D near the designation "W," indicating west.
FIGURE 19 is a portion of a generated voltage wave as recorded on the recording device which is produced under the situation of FIGURE 18.

In FIGURES 18 and 19, the magnetic field is shifted to the position D and is close to the perimeter of the scanning and produces the wave 96 of FIGURE 19. The maximum amplitude 97 is greater than a minimum amplitude 98 because the object or variable field influence is close to the perimeter of the sweep of the rotating vane 46.

The present discussion with respect to the FIGURES 12 to 19 has assumed that there is no relative movement between the object or the variable field influence and the sweep compass, and that the settings of the search compass by the verniers have been established by a predetermined reference line. This is the type of operation one may employ in locating the presence of oil in geophysical survey work and as further explained in my application Serial No. 731,358. In the location of oil below substrata, the location of the positions A to D in FIGURES 12, 14, 16 and 18 would be partly influenced by the magnetic field distortion created by the spontaneous potentials existing in the oil substratas.

Figures 20, 21:
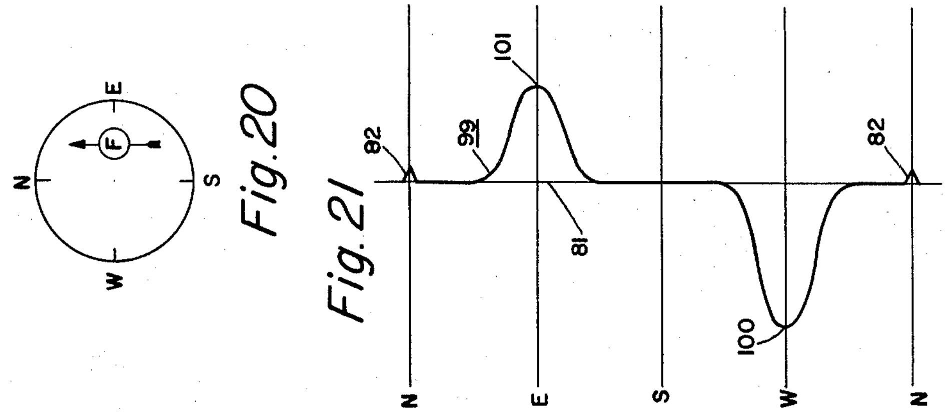
FIGURE 20 is a diagrammatic illustration of the end of the core with the center of the field being located at position F but moving in the direction of the arrow.
FIGURE 21 is a portion of a generated voltage wave as recorded on the recording device which is produced under the situation of FIGURE 20.

The FIGURE 20 shows the object or variable field influence moving, such as indicated by the arrow F. The movement of the magnetic field, such as indicated by the arrow, may represent the relative movement between the sweep compass and a submarine, for example.

The FIGURE 21 shows a curve 99 which would be produced on the recorder and the maximum amplitude is indicated at 100 and the minimum amplitude is indicated at 101. The length of the period for the portion under the maximum amplitude 100 is less than the length of the normal period between South and North for object or variable field influences, which indicates that the object or variable field influence is moving in a counter direction to the rotation of the vane 46.

Figure 22:
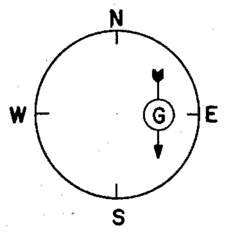
FIGURE 22 is a diagrammatic illustration of the end of the core with the center of the field being located at position G but moving in the direction of the arrow.
Figure 23:
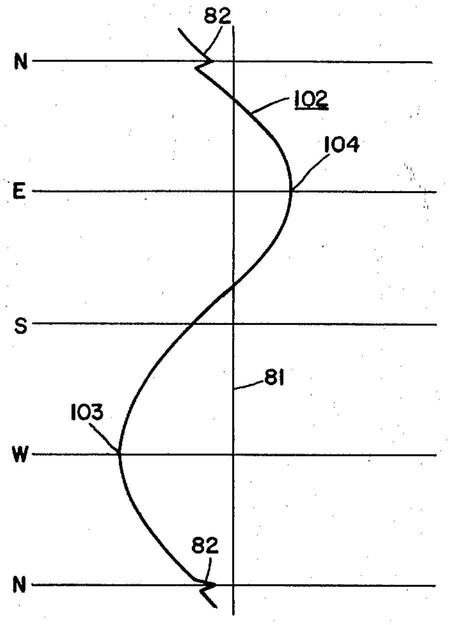
FIGURE 23 is a portion of a generated voltage wave as recorded on the recording device which is produced under the situation of FIGURE 22.

In FIGURES 22 and 23, a reverse situation is indicated in that the magnetic lines are distorted to the position G and are moving in the direction of the arrow. The wave induced under the situation of FIGURE 22 is indicated by the reference character 102 in FIGURE 23 and the maximum amplitude is indicated at 103 and the minimum amplitude at 104. The length of the portion under the maximum amplitude is greater than the distance between South and North, indicating that the object or variable field influence is moving in the same direction as the rotation of the vanes 46.

The invention is useful in locating fixed objects or varable field influences with respect to the location of the scanning compass or is useful in locating moving objects or variable field influences.

Figure 28:
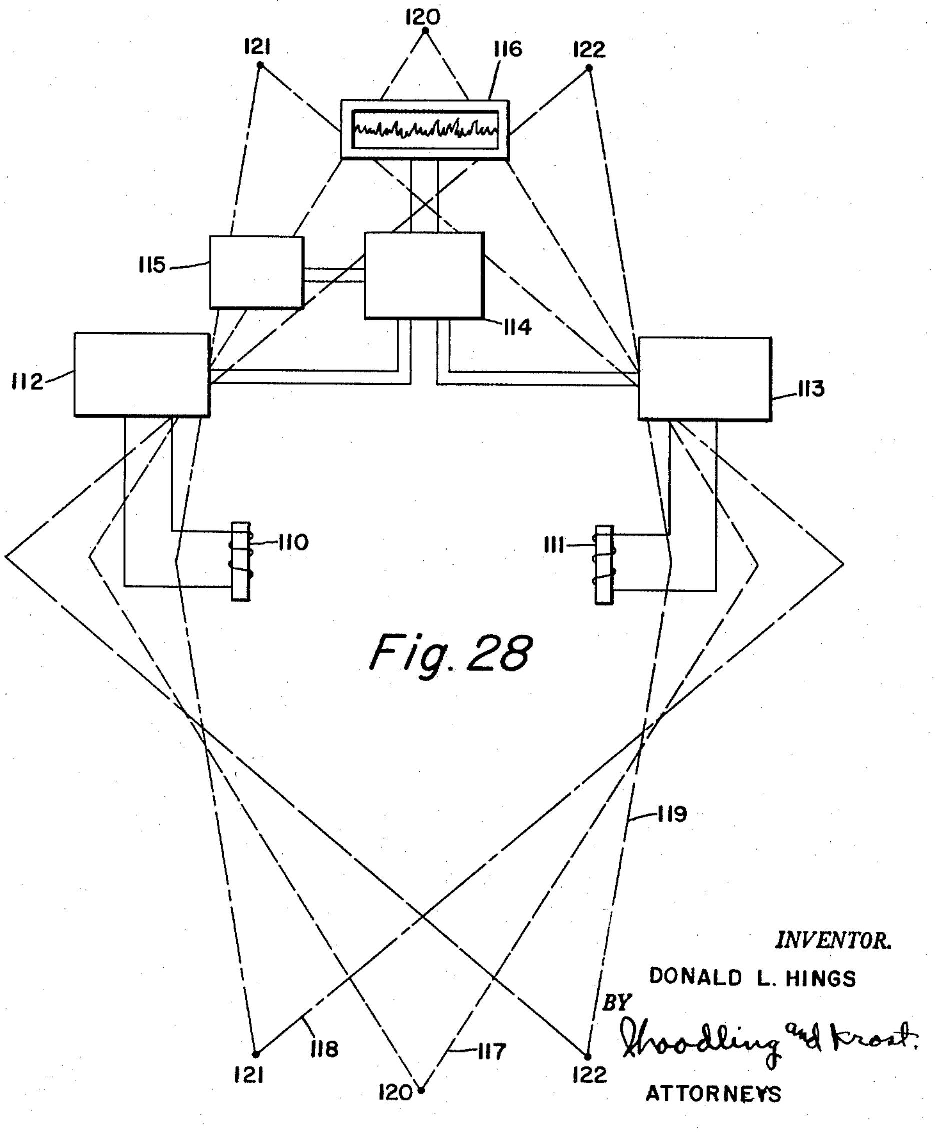
FIGURE 28 is a diagrammatic illustration of two searching coils operated as focusing devices for sweep-scanning an area.

The description of the invention up to the present has dealt with location of objects and variable field influences by scanning with a rotational sweep. The FIGURE 28 shows an arrangement which locates objects and variable field influences by a swinging sweep through a portion of an arc. In FIGURE 28, the reference characters 110 and 111 represent two non-scanning coils but the coils are positioned laterally apart from each other and substantially parallel. The voltage generated in the coil 110 is connected to an amplifier 112 and the voltage generated in the coil 111 is connected to an amplifier 113. The voltages generated by the coils 110 and 111 are in opposite phase respect to each other, and the amplifier voltages are connected to a mixer 114 which, in turn, is connected to a recorder 116. The reference character 115 represents a device which varies the gain of the amplifiers 112 and 113 alternately with respect to each other. Thus, when the amplifier 112 has a maximum gain, the amplifier 113 has a minimum gain, and vice versa. When the gain is the same for both amplifiers, the effective sensitivity field pattern is indicated by the short dotted lines 117 which come to a focal point or point of maximum sensitivity at a point 120. With the amplifier 113 having a larger gain than the amplifier 112, then the effective sensitivity field pattern is indicated by the dash-dot line 118 which has a focal point or point of maximum sensitivity at 121. Conversely, when the amplifier 112 has a maximum gain and the amplifier 113 has a minimum gain, then the effective sensitivity field pattern is indicated by the long dash line 119, which has a focal point or point of maximum sensitivity at 122.

The sweep action in the arrangement in FIGURE 28 produces a relative sine wave proportional to the areas of magnetic line concentration. Any moving object or variable field influences within the sweep would show up as a variation in the wave produced. The sweep in FIGURE 28 is between the points 121 and 122. The sweep system as shown in FIGURE 28 has a larger range than the rotational sweep shown in the previous figures and finds particular application to locating submarines because the sweep may extend as much as several miles on each side of the airplane or boat carrying the equipment. The movement of the carrier is not as critical as in the rotational type of sweep. One reason that the equipment in FIGURE 28 is not influenced by the movement of the carrier is that the period of the movement is usually outside of the reactance time of the coil. Also in the case of the rotational sweep, the equipment is substantially free from vibration and movement of the carrier, such as airplane, vehicle or boat, because the normal period of vibration of the carrier is outside of the frequency range of the resonant period of the coil and core.

Many combinations may be evolved using the invention of the rotational type of sweep and the swinging type of sweep.

The amplifiers used in the present invention may be of the type sold by Hewlett-Packard Company of California, Model #425–A, under the designation Microvolt-Ammeter. This unit will record from one microvolt to one volt in eleven ranges. Any range may be selected so that the recording meter stays within the bounds of the limitations of the recorder.

Although this invention has been described in its preferred form with a certain degree of particularlity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In combination, first coil means, first core means for said first coil means, said first core means having an inductive axis, movable support means to support said first coil means and said first core means as a unit, said movable support means comprising a first support member turnable about an axis extending in a first direction and a second support member mounted on said first support member and turnable about an axis in a second direction extending substantially perpendicular to said first direction, means to adjust said first and second support members to direct said axis of said first core means in any one of a plurality of directions including a direction substantially in alignment with the earth's total magnetic field, said first core means having a core coupling end portion, armature means having a sweeping coupling end portion, said sweeping coupling end portion being radially positioned to one side of and at a distance from said axis, means to revolve said armature means in a sweeping path about said axis with said sweeping coupling end portion moving relative to said core coupling end portion of said first core means to generate substantially a sine wave in said coil means when the axis of the first core means is in a direction substantially in alignment with the earth's total magnetic field, said core coupling end portion including a plurality of magnetic permeable means disposed at peripherally spaced intervals about said axis and at variable distances therefrom, said magnetic permeable means cooperating with said sweeping coupling end portion of said armature means to vary the magnetic coupling between said first core means and said armature means to substantially neutralize said sine wave as said armature mens is revolved about said axis when said axis is in a direction substantially in alignment with the earth's total magnetic field.

2. In combination, first coil means, first core means for said first coil means, said first core means having an inductive axis, movable support means to support said first coil means and said first core means, as a unit, said movable support means comprising a first support member turnable about an axis extending in a first direction and a second support member mounted on said first support member and turnable about an axis in a second direction extending substantially perpendicular to said first direction, means to adjust said first and second support members to direct said axis of said first core means in any one of a plurality of directions including a direction substantially in alignment with the earth's total magnetic field, said first core means having a core coupling end portion, armature means having a sweeping coupling end portion, said sweeping coupling end portion being radially positioned to one side of and at a distance from said axis, means to revolve said armature means in a sweeping path about said axis with said sweeping coupling end portion moving relative to said core coupling end portion, said core coupling end portion comprising a plurality of iron core coupling members positioned about said axis and disposed in an annular series of alternately close and loose coupling relationships with said sweeping coupling means, said sweeping coupling passing relative to said plurality of iron core coupling members in a course of one revolution of said armature means to vary the magnetic coupling between said first core means and said armature means as said armature means is revolved about said axis.

3. In combination, first coil means, first core means for said first coil means, said first core means having an inductive axis, movable support means to support said first coil means and said first core means as a unit, said movable support means comprising a first support member turnable about an axis extending in a first direction and a second support member mounted on said first support member and turnable about an axis in a second direction extending substantially perpendicular to said first direction, means to adjust said first and second support members to direct said axis of said first core means in any one of a plurality of directions including a direction substantially in alignment with the earth's total magnetic field, said first core means having a core coupling end portion, armature means having a sweeping coupling end portion, said sweeping coupling end portion being radially positioned to one side of and at a distance from said axis, means to revolve said armature means in a sweeping path about said axis with said sweeping coupling end portion moving relative to said core coupling end portion, said core coupling end portion comprising a plurality of iron core coupling members positioned about said axis and disposed in an annular series of alternately close and loose coupling relationships with said sweeping coupling means, said sweeping coupling passing relative to said plurality of iron core coupling members in a course of one revolution of said armature means to vary the magnetic coupling between said first core means and said armature means as said armature means is revolved about said axis.

4. In combination, first coil means, first core means for said first coil means, said first core means having an inductive axis, movable support means to support said first coil means and said first core means as a unit, said movable support means comprising a first support member turnable about an axis extending in a first direction and a second support member mounted on said first support member and turnable about an axis in a second direction extending substantially perpendicular to said first direction, means to adjust said first and second support members to direct said axis of said first core means in any one of a plurality of directions including a direction substantially in alignment with the earth's total magnetic field, said first core means having a core coupling end portion, armature means having a sweeping coupling end portion, said sweeping coupling end portion being radially positioned to one side of and at a distance from said axis, means to revolve said armature means in a sweeping path about said axis with said sweeping coupling end portion moving relative to said core coupling end portion, said core coupling end portion comprising a plurality of iron core coupling members positioned about said axis and disposed in an annular series of alternately close and loose coupling relationships with said sweeping coupling means, said sweeping coupling passing relative to said plurality of iron core coupling members in a course of one revolution of said armature means to vary the magnetic coupling between said first core means and said armature means as said armature means is revolved about said axis, compensating coil means surrounding said coupling end portions, and means to energize said compensating coil means.

5. In combination, first coil means, first core means for said first coil means, said first core means having an inductive axis, movable support means to support said first coil means and said first core means as a unit, said movable support means comprising a first support member turnable about an axis extending in a first direction and a second support member mounted on said first support member and turnable about an axis in a second direction extending substantially perpendicular to said first direction, means to adjust said first and second support members to direct said axis of said first core means in any one of a plurality of directions including a direction substantially in alignment with the earth's total magnetic field, said first core means having a core coupling end portion, armature means having a sweeping coupling end portion, said sweeping coupling end portion being radially positioned to one side of and at a distance from said axis, means to revolve said armature means in a sweeping path about said axis with said sweeping coupling end portion moving relative to said core coupling end portion comprising a plurality of iron core coupling members positioned about said axis and disposed in an annular series of alternately close and loose coupling relationships with said sweeping coupling means, said sweeping coupling passing relative to said plurality of iron core coupling members, said core coupling end portion in a course of one revolution of said armature means to vary the magnetic coupling between said first core means and said armature means as said armature means is revolved about said axis.

6. In combination, first and second coil means, first and second core means respectively for said first and second coil means, said first and second core means having respectively first and second inductive axes, said first coil means and said first core means having substantially the same electrical and magnetic dimensions as those for said second coil means and said second core means, first movable support means to support said first coil means and said first core means as a unit, said first movable support means comprising a first support member turnable about a first support axis and a second support member mounted on said first support member and turnable about a second support axis extending substantially perpendicular to said first support axis, means to adjust said first and second support members to direct said axis of said first core means in any one of a plurality of directions including a direction substantially in alignment with the earth's total magnetic field, second movable support means to support said second coil means and said second core means as a unit, said second movable support means comprising a third support member turnable about a third support axis and a fourth support member mounted on said third support member and turnable about a fourth support axis extending substantially perpendicular to said third support axis, means to adjust said third and fourth support members to direct said axis of said second core means in any one of a plurality of directions including a direction substantially in alignment with the earth's total magnetic field, said first core means having a core coupling end portion, armature means having a sweeping coupling end portion, said sweeping coupling end portion being radially positioned to one side of and at a distance from the axis of said first core means, means to revolve said armature means in a sweeping path about the axis of the first core means with said sweeping coupling end portion thereof moving relative to said coupling end portion of said first core means, said core coupling end portion comprising a plurality of iron core coupling members positioned about said first axis and disposed in an annular series of alternately close and loose coupling relationships with said sweeping coupling means, said sweeping coupling passing relative to said plurality of iron core coupling members to vary the magnetic coupling between said first core means and said armature means as said armature means is revolved about said first axis, electrical connection means to connect said first and second coil means in electrical opposition with each other to produce substantially only potentials induced by the rotation of said armature means about said first axis.

7. In combination, first and second coil means, first and second core means respectively for said first and second coil means, said first and second core means having respectively first and second inductive axes, said first coil means and said first core means having substantially the same electrical and magnetic dimensions as those for said second coil means and said second core means, means to support said first coil means and said first core means as a first unit and said second coil means and said second core means as a second unit with the axes of said first and second core means substantially parallel to each other and in a direction substantially in alignment with the earth's total magnetic field, said first core means having a core coupling end portion, armature means having a sweeping coupling end portion, said sweeping coupling end portion being radially positioned to one side of and at a distance from the axis of said first core means, means to revolve said armature means in a sweeping path about the axis of the first core means with said sweeping coupling end portion thereof moving relative to said core coupling end portion of said first core means, said core coupling end portion of said first core means comprising a plurality of iron core coupling members positioned about said first axis and disposed in an annular series of alternately close and loose coupling relationships with said sweeping coupling means, said sweeping coupling passing relative to said plurality of iron core coupling members to vary the magnetic coupling between said first core means and said armature means as said armature means is revolved about said first axis, electrical connection means to connect said first and second coil means in electrical opposition with each other to produce substantially only potentials induced by the rotation of said armature means about said first axis.

8. In combination, first and second coil means, first and second core means respectively for said first and second coil means, said first and second core means having respectively first and second inductive axes, said first coil means and said first core means having substantially the same electrical and magnetic dimensions as those for said second coil means and said second core means, means to support said first coil means and said first core means as a first unit and said second coil means and said second core means as a second unit with the axes of said first and second core means substantially parallel to each other and in a direction substantially in alignment with the earth's total magnetic field, said first core means having a core coupling end portion, armature means having a sweeping coupling end portion, said sweeping coupling end portion being radially positioned to one side of and at a distance from the axis of said first core means, means to revolve said armature means in a sweeping path about the axis of the first core means with said sweeping coupling end portion thereof moving relative to said core coupling end portion of said first core means, comprising a plurality of iron core coupling members positioned about said first axis and disposed in an annular series of alternately close and loose coupling relationships with said sweeping coupling means, said sweeping coupling passing relative to said plurality of iron core coupling members in a course of one revolution of said armature means to vary the magnetic coupling between said first core means and said armature means as said armature means is revolved about said first axis, electrical connection means to connect said first and second coil means in electrical opposition with each other to produce substantially only potentials induced by the rotation of said armature means about said first axis.

9. In combination, first and second coil means, first and second core means respectively for said first and second coil means, said first and second core means having respectively first and second inductive axes, said first coil means and said first core means having substantially the same electrical and magnetic dimensions as those for said second coil means and said second core means, means to support said first coil means and said first core means as a first unit and said second coil means and said second core means as a second unit with the axes of said first and second core means substantially parallel to each other and in a direction substantially in alignment with the earth's total magnetic field, said first core means having a core coupling end portion, armature means having a sweeping coupling end portion, said sweeping coupling end portion being radially positioned to one side of and at a distance from the axis of said first core means, synchronous means to revolve said armature means in a path about the axis of the first core means with said sweeping coupling end portion thereof moving relative to said core coupling end portion of said first core means, said core coupling end portion comprising a plurality of iron core coupling members positioned about said first axis and disposed in an annular series of alternately close and loose coupling relationships with said sweeping coupling means, said sweeping coupling passing relative to said plurality of iron core coupling members in a course of one revolution of said armature means to vary the magnetic coupling between said first core means and said armature means as said armature means is revolved about said first axis, electrical connection means to connect said first and second coil means in electrical opposition with each other to produce substantially only potentials induced by the rotation of said armature means about said first axis, display means, and means to impress said potentials on said display means.

10. In combination, first and second coil means, first and second core means respectively for said first and second coil means, said first and second core means having respectively first and second inductive axes, said first coil means and said first core means having substantially the same electrical and magnetic dimensions as those for said second coil means and said second core means, means to support said first coil means and said first core means as a first unit and said second coil means and said second core means as a second unit with the axes of said first and second core means substantially parallel to each other and in a direction substantially in alignment with the earth's total magnetic field, said first core means having a core coupling end portion, armature means having a sweeping coupling end portion, said sweeping coupling end portion being radially positioned to one side of and at a distance from the axis of said first core means, synchronous means to rotate said armature means in a path about the axis of the first core means with said sweeping core coupling end portion thereof moving relative to said coupling end portion of said first core means with each rotation starting from an armature reference cycle starting point, said core coupling end portion comprising a plurality of iron core coupling members positioned about said first axis and disposed in an annular series of alternately close and loose coupling relationships with said sweeping coupling means, said sweeping coupling passing relative to said plurality of iron core coupling members in a course of one revolution of said armature means to vary the magnetic coupling between said first core means and said armature means as said armature means is revolved about said first axis, electrical connection means to connect said first and second coil means in electrical opposition with each other to produce substantially only deviation scanning potentials induced by the rotation of said armature means about said first axis, recorder means having movable surface means driven at a speed related to the speed of rotation of said armature means, connection means to impress said deviation scanning potentials upon said recorder means and thereby producing on said movable surface means a graph of at least one cycle depicting the wave form of said deviation scanning potentials with said at least one cycle of said graph having a potential reference starting point synchronously related to said armature reference cycle starting point.

11. In combination, first and second coil means, first and second core means respectively for said first and second coil means, said first and second core means having respectively first and second inductive axes, said first coil means and said first core means having substantially the same electrical and magnetic dimensions as those for said second coil means and said second core means, means to support said first coil means and said first core means as a first unit and said second coil means and said second core means as a second unit with the axes of said first and second core means substantially parallel to each other and in a direction substantially in alignment with the earth's total magnetic field, said first core means having a core coupling end portion, armature means having a sweeping coupling end portion, said sweeping coupling end portion being radially positioned to one side of and at a distance from the axis of said first core means, synchronous means to rotate said armature means in a path about the axis of the first core means with said sweeping coupling end portion thereof moving relative to said coupling end portion of said first core means with each rotation starting from an armature reference cycle starting point, said core coupling end portion comprising a plurality of iron core coupling members positioned about said first axis and disposed in an annular series of alternately close and loose coupling relationships with said sweeping coupling means, said sweeping coupling passing relative to said plurality of iron core coupling members in a course of one revolution of said armature means to vary the magnetic coupling between said first core means and said armature means as said armature means is revolved about said first axis, electrical connection means to connect said first and second coil means in electrical opposition with each other to produce substantially only deviation scanning potentials induced by the rotation of said armature means about said first axis, recorder means having movable surface means driven at a speed related to the speed of rotation of said armature means, connection means to impress said deviation scanning potentials upon said recorder means and thereby producing on said movable surface means a graph of at least one cycle depicting the wave form of said deviation scanning potentials with said at least one cycle of said graph having a potential reference starting point synchronously related to said armature reference cycle starting point, said first coil means and said first core means as a unit and said second coil means and said second core means as a unit having respectively resonant periods substantially the same as the duration of a repeatable cycle of the rotation of said armature means.

12. In a geophysical survey apparatus, iron core means having an axis, coil means mounted on said iron core means, means to support said iron core means with its axis substantially in alignment with the direction of the earth's total magnetic field, armature means, means to rotate said armature means about said axis and relative to said iron core means to generate an alternating current sine wave voltage in said coil means by cutting the earth's total magnetic field, said iron core means having an end portion constituting core coupling means, said armature means having an end portion constituting sweeping coupling means, said core coupling means comprising a plurality of iron core coupling members positioned about said axis and disposed in an annular series of alternately close and loose coupling relationships with said sweeping coupling means as it is rotated in a course of one revolution, said sweeping coupling means passing relative to said plurality of iron core coupling members in a course of one revolution of said armature means to vary the magnetic coupling between said first core means and said armature means to substantially neutralize said generated sine wave voltage as said armature means is revolved about said axis of said iron core means supported in substantial alignment with the directions of the earth's total magnetic field.

13. In combination, first magnetic means comprising synchronously driven magnetic scanning means including magnetically permeable first core means having an axis, first coil means mounted on said first core means, means to support said first core means and the first coil means mounted thereon with the axis of said first core means substantially in alignment with the direction of the earth's total magnetic field, said first core means having a core coupling end portion, armature means having a sweeping coupling end portion rotatable relative to said core coupling end portion of said first core means, synchronous drive means to synchronously rotate said armature means relative to said first core means in a sweeping path about said axis with said sweeping coupling end portion revolving relative to said core coupling end portion through repeatable cycles of 360 degrees about said axis with each revolution starting from an armature reference cycle starting point to generate substantially an alternating current voltage in said coil means by cutting the earth's total magnetic field, said first coil means also having potentials induced therein by changes in the earth's minutial diurnal fields and producing along with said generated alternating current voltage a resultant voltage, recorder means having movable surface means driven at a speed related to the speed of rotation of said armature means, connection means to impress said resultant voltage in said coil means upon said recorder means and thereby producing on said movable surface means a graph of at least one cycle depicting the wave form of said resultant voltage in said coil means with said at least one cycle of said graph having a potential reference starting point synchronously related to said armature reference cycle starting point.

14. In combination, first magnetic means comprising synchronously driven magnetic scanning means including magnetically permeable first core means having an axis, first coil means mounted on said first core means, means to support said first core means and the first coil means mounted thereon with the axis of said first core means substantially in alignment with the direction of the earth's total magnetic field, said first core means having a core coupling end portion, armature means having a sweeping coupling end portion rotatable relative to said core coupling end portion of said first core means, synchronous drive means to synchronously rotate said armature means relative to said first core means in a sweeping path about said axis with said sweeping coupling end portion revolving relative to said core coupling end portion through repeatable cycles of 360 degrees about said axis with each revolution starting from an armature reference cycle starting point to generate substantially an alternating current voltage in said first coil means by cutting the earth's total magnetic field, said first coil means also having potentials induced therein by changes in the earth's minutial diurnal fields and producing along with said generated alternating current voltage a resultant voltage, recorder means having movable surface means driven at a speed related to the speed of rotation of said armature means, connection means to impress said resultant voltage in said coil means upon said recorder means and thereby producing on said movable surface means a graph of at least one cycle depicting the wave form of said resultant voltage in said coil means with said at least one cycle of said graph having a potential reference starting point synchronously related to said armature reference cycle starting point, said magnetically permeable core means and said coil means having a resonant period substantially the same as the duration of one cycle of the synchronously driven scanning means.

15. In combination, first magnetic means comprising synchronously driven magnetic scanning means including magnetically permeable first core means having an axis, first coil means mounted on said first core means, means to support said first core means and the first coil means mounted thereon with the axis of said first core means substantially in alignment with the direction of the earth's total magnetic field, said first core means having a core coupling end portion, armature means having a sweeping coupling end portion rotatable relative to said core coupling end portion of said first core means, synchronous drive means to synchronously rotate said armature means relative to said first core means in a sweeping path about said axis with said sweeping coupling end portion revolving relative to said core coupling end portion through repeatable cycles of 360 degrees about said axis with each revolution starting from an armature reference cycle starting point to generate substantially an alternating current voltage in said first coil means by cutting the earth's total magnetic field, said first coil means also having potentials induced therein by changes in the earth's minutial diurnal fields and producing along with said generated alternating current voltage a resultant voltage, display means, and means to impress said resultant voltage upon said display means to depict at least one cycle of the wave form of said resultant voltage with said at least one cycle having a potential reference starting point synchronously related to said armature reference cycle starting point.

16. In combination, first magnetic means comprising synchronously driven magnetic scanning means including magnetically permeable first core means having an axis, first coil means mounted on said first core means, means to support said first core means and the first coil means mounted thereon with the axis of said first core means substantially in alignment with the direction of the earth's total magnetic field, said first core means having a core coupling end portion, armature means having a sweeping coupling end portion rotatable relative to said core coupling end portion of said first core means, synchronous drive means to synchronously rotate said armature means relative to said first core means in a sweeping path about said axis with said sweeping coupling end portion revolving relative to said core coupling end portion through repeatable cycles of 360 degrees about said axis with each revolution starting from an armature reference cycle starting point to generate substantially an alternating current voltage in said first coil means by cutting the earth's total magnetic field, said first coil means also having potentials induced therein by changes in the earth's minutial diurnal fields and producing along with said generated alternating current voltage a resultant voltage, second magnetic means comprising magnetically permeable second core means having an axis positioned substantially parallel to said axis of said first core means, second coil means mounted on said second core means, said second coil having potentials induced therein by changes in the earth's minutal diurnal fields, mixer means, first connection means for connecting said first coil means to said mixer means, second connection means for connecting said second coil means to said mixer means in opposition to said first coil means to substantially cancel out said induced potentials in said mixer means, thereby leaving only the generated alternating current voltage in said mixer means, recorder means having movable surface means driven at a speed related to the speed of rotation of said armature means, connection means to impress said generated alternating current voltage in said mixer means upon said recorder means and thereby producing on said movable surface means a graph of at least one cycle depicting the wave form of said alternating current voltage in said mixer means with said at least one cycle of said graph having a potential reference cycle starting point synchronously related to said armature reference cycle starting point.

References Cited by the Examiner

UNITED STATES PATENTS

| | | | |
|---|---|---|---|
| 1,137,544 | 4/15 | Severy et al. | |
| 2,038,787 | 4/36 | Guerra | 33—204 |
| 2,201,559 | 5/40 | Moseley | 33—204 |
| 2,334,469 | 11/43 | Alexandersson et al. | 33—204 |
| 2,432,089 | 12/47 | Carter et al. | 317—249 |
| 2,444,290 | 6/48 | Grandqvist. | |
| 2,464,057 | 3/49 | Phair | 33—204 |
| 2,564,854 | 8/51 | Muffly | 324—43 X |
| 2,825,977 | 3/58 | Fayers et al. | 33—204 |

WALTER L. CARLSON, *Primary Examiner.*

SAMUEL BERNSTEIN, *Examiner.*